Oct. 21, 1952     C. I. CEDERHOLM     2,614,330
MEASURING INSTRUMENT
Filed June 30, 1950
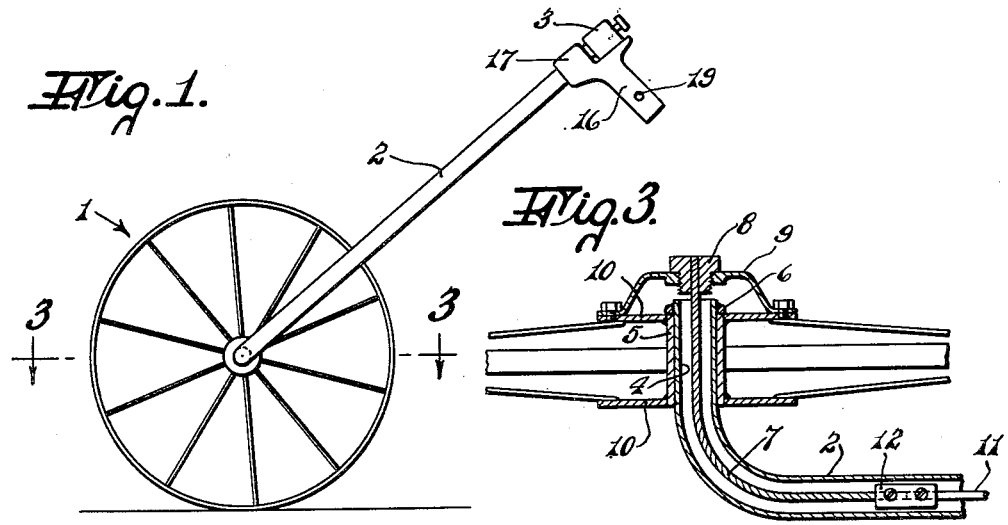
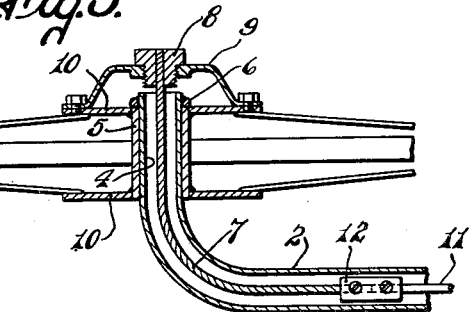
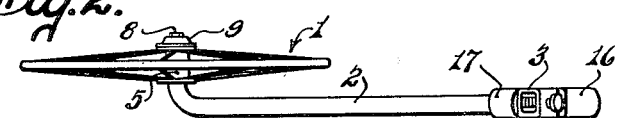
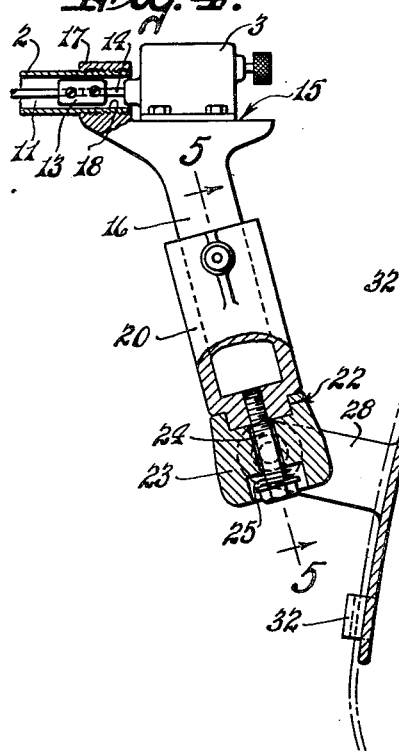
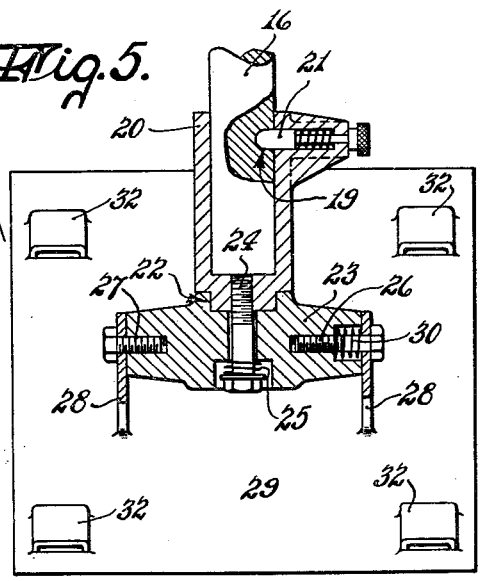
INVENTOR
CARL I. CEDERHOLM
BY *Chapin & Neal*
ATTORNEYS Patented Oct. 21, 1952

2,614,330

UNITED STATES PATENT OFFICE 2,614,330

MEASURING INSTRUMENT

Carl I. Cederholm, South Worthington, Mass.

Application June 30, 1950, Serial No. 171,377

7 Claims. (Cl. 33—141)

This invention relates to improvements in ground measuring instruments of the type in which a wheel of determined circumference is rolled over the ground to measure linear distances which may be used in calculations of area.

An object of the invention is to provide, on such an instrument, a novel and convenient means for counting the revolutions of the wheel, and for making such count readily observable by an operator. A further object is to provide a rugged and efficient structure for transmitting revolutions of the wheel into numbers on a visual counter. Yet another object of the invention is to provide an inexpensive, easily manipulated structure, which at the same time is rugged and efficient for attaching the measuring wheel to an automobile or other vehicle if desired.

These and other objects and advantages of the present invention will be more fully appreciated from a consideration of the following specification and accompanying drawings.

In the drawings:

Fig. 1 is a side elevation of the instrument;

Fig. 2 is a top plan of the same;

Fig. 3 is a sectional detail, on an enlarged scale, taken on line 3—3 of Fig. 1, and showing the hub of the instrument wheel;

Fig. 4 is a detail, on an enlarged scale and partly in section, of the handle grip portion of the instrument; and Fig. 5 is a sectional view taken on line 5—5 of Fig. 4.

The instrument, as shown in Fig. 1, comprises a wheel 1 of a determined size, preferably 6.6 feet, or 0.1 chain, in circumference, rotatably mounted on an elongated handle 2. As shown best by Fig. 2, the wheel is mounted to the right of the handle, so that as a right-handed operator "walks" the wheel before him the wheel will be out of the way of his feet. When the wheel is rolled over the ground, its revolutions are registered on a counter at 3 which is positioned for ready observation by an operator. The revolution readings on the counter may be readily converted into area expressed in square chains, which figure is convertible into acreage by dividing it by ten. It will be noted the wheel 1 is preferably provided with ten spokes for more accurate measurement than is provided by a counter which registers only full revolutions of the wheel.

Referring now to Fig. 3, it is seen that the handle 2 is tubular and is bent adjacent one end to provide an integral offset extension 4. The hub 5 of the wheel 1 is supported by and rotates about the extension 4. A lock ring 6 fastened on the outer end of the extension 4 serves as a washer to secure the handle to the wheel. A flexible cable 7 is secured by a split cone nut 8 to a cap 9 which in turn is bolted to a hub disc 10 of the wheel. The discs 10, mounted on opposite ends of the hub 5, are fixed to the spokes of the wheel in a usual or any suitable manner. Thus, rotation of the wheel 1 causes the cable 7 to rotate with it.

The extension of the cable 7 which lies in the handle 2, beyond the curved portion which connects the offset 4 with the elongated portion of the handle, is attached to a rigid drive shaft 11 by a coupling 12. It will be noted the coupling 12 also serves as a bearing for the shaft 11 and cable 7. This holds the cable 7 and shaft 11 spaced from the walls of the handle 2, thus avoiding inefficiency and inaccuracy in transmission of wheel revolutions to the counter 3 and preventing abrasion of the cable.

Referring now to Fig. 4, it is seen that at the upper end of the handle 2, the shaft 11 is connected, by a bearing coupling 13, to a drive rod 14 of the counter mechanism 3. The register 3 is supported upon and releasably secured as by bolts to a shelf at 15 which is formed on the top of a pistol grip 16. An upstanding lug 17 at the front of the grip 16 is threaded internally to receive a threaded end portion 18 of the handle 2. The lug 17 thus provides a secure connection between the handle 2, the counter 3, and the grip 16.

It will now be understood that the cable 7, fastened to and driven by the wheel 1, provides, together with the shaft 11 an efficient and sturdy means for transmitting the revolutions of the wheel to the counter 3 adjacent the operator's hand on the grip 16. On a measuring instrument constructed according to the improvements of my invention, the counter is not only driven accurately and efficiently, but is also conveniently positioned on the instrument for reading by an operator.

It will be noted the grip 16 is provided with a socket 19. This is for attachment of the instrument to the bumper of an automobile so that relatively great distances may be measured quickly and easily. Figs. 4 and 5 show a preferred form of structure for effecting this attachment.

A cylindrical member 20 is adapted to encase the lower end of grip 16 and to be removably secured thereon by a spring pressed pin 21 seated in the socket 19. The member 20 has its closed end seated in a cylindrical recess 22 formed in a cross brace 23. A bolt 24 extends through brace 23 and is axially threaded into the closed end of member 20. It will be noted that the shank of bolt 24 fits loosely in the brace 23 and that the head of the bolt is held spaced from the body of brace 23 by a compression spring 25.

Pivotally secured at 26 and 27 to the ends of brace 23 are arms 28 welded or otherwise secured to a clip 29 which is adapted to be hooked onto the bumper of an automobile. A spring 30 frictionally retards the pivotal connection at 26.

The springs 25 and 30, together with member 20 and brace 23, will be seen to provide a frictional universal swivel connection between the bumper clip 29 and the handle 2 of the measuring instrument.

By means of straps indicated in dotted lines at 31 in Fig. 4 passed through loops 32 struck from the clip 29, the latter may be quickly and firmly strapped to the bumper of an automobile for a motorized tractor or pusher operation of the measuring wheel over relatively long distances. Similarly, the measuring wheel may be quickly removed from the automobile bumper for storage or for manual operation over short stretches of rugged terrain.

What is claimed is:

1. In a ground measuring instrument having a wheel of determined circumference and an elongated tubular handle attached thereto, means for attaching said handle to said wheel including an offset extension of said handle mounted in the hub of said wheel and a lock ring washer fixed on the outermost end of said extension, a pistol grip secured to said handle remote from said wheel, a revolution counter mounted upon said grip, means connecting said counter to said wheel whereby the revolutions of said wheel are counted by and registered upon said counter, said means including a rigid drive shaft coupled to the drive rod of said counter and extending axially and longitudinally in said handle to adjacent the offset extension thereof, a flexible cable secured at one end to said wheel and extending through said offset handle extension to lie with its other end adjacent said drive shaft, and a coupling bearing attaching the adjacent ends of said cable and said shaft and holding them spaced from the walls of said handle, and means for removably attaching the instrument to the bumper of an automobile including a socket in said grip, a cylindrical member adapted to encase the lower end of said grip, a spring-pressed pin in said member for insertion in said socket, a cross brace resiliently and swivellably fixed on said cylindrical member, and a bumper clip resiliently attached to said cross brace.

2. In a ground measuring instrument having a wheel of determined circumference and an elongated tubular handle attached thereto, means for attaching said handle to said wheel including an offset extension of said handle mounted in the hub of said wheel and a lock ring washer fixed on the outermost end of said extension, a pistol grip secured to said handle remote from said wheel, a shelf on the uppermost portion of said grip, a revolution counter mounted upon said shelf, means connecting said counter to said wheel whereby the revolutions of said wheel are counetd by and registered upon said counter, said means including a rigid drive shaft coupled to the drive rod of said counter and extending axially and longitudinally in said handle to adjacent the offset extension thereof, a flexible cable coupled to said drive shaft and communicating through said offset to the outermost end of the same, a cap fixed on said wheel, and a split cone nut fixed in said cap securing the outermost end of said cable to said wheel for driving the cable.

3. In a ground measuring instrument having a wheel of determined circumference and an elongated tubular handle attached thereto, means for attaching said handle to said wheel including an offset extension of said handle mounted in the hub of said wheel and a lock ring washer fixed on the outermost end of said extension, a pistol grip secured to said handle remote from said wheel, a shelf on the uppermost portion of said grip, a revolution counter mounted upon said shelf, means connecting said counter to said wheel whereby the revolutions of said wheel are counted by and registered upon said counter, said means including a rigid drive shaft coupled to the drive rod of said counter and extending axially and longitudinally in said handle to adjacent the offset extension thereof, a flexible cable coupled to said drive shaft and communicating through said offset to the outermost end of the same, a cap fixed on said wheel, and a split cone nut fixed in said cap securing the outermost end of said cable to said wheel for driving the cable, and means for removably attaching the instrument to the bumper of an automobile including a socket in said grip, a cylindrical member adapted to encase the lower end of said grip, a spring-pressed pin in said member for insertion in said socket, a cross brace resiliently and swivellably fixed on said cylindrical member, and a bumper clip resiliently attached to said cross brace, said clip being provided with aligned loops for the reception of an attaching strap.

4. A ground measuring instrument comprising a wheel of determined circumference, an open ended tubular handle for propelling the wheel over the ground, said handle having one end portion bent through an arc of ninety degrees to form a wheel supporting portion, said wheel being rotatably mounted on said portion adjacent the free end thereof, a member secured to the said wheel to rotate therewith and extending over the adjacent open end of the tubular handle, a flexible driving cable positioned within the tubular handle and having one end secured to said member, a counter having a driving rod mounted at the other end of said handle and means connecting the other end of said flexible cable to said counter driving rod to actuate the counter on rotation of the wheel.

5. A ground measuring instrument comprising a wheel of determined circumference, an open ended tubular handle, said handle having an elongated straight body portion and one end portion bent through an arc of ninety degrees, to position said end portion at a right angle to the body portion, means to mount said wheel rotatably on said end portion adjacent the free end thereof, a member secured to said wheel to rotate therewith and extending over the adjacent open end of the tubular handle, a counter having a driving rod mounted at the other end portion of the handle, a rotatable shaft positioned in the straight portion of the handle, a coupling connecting one end of said shaft to said counter driving rod, a flexible cable positioned in the bent end portion of said handle and extending into the straight body portion thereof, said cable having one end secured to said member and a coupling connecting the other end of the cable to the other end of the shaft.

6. A ground measuring instrument comprising a wheel of determined circumference, an open ended tubular handle, said handle having an elongated straight body portion and one end portion bent through an arc of ninety degrees to position said end portion at a right angle to the body portion, means to mount said wheel rotatably on said end portion adjacent the free end thereof, a member secured to said wheel to rotate therewith and extending over the adjacent open end of the tubular handle, a counter having a driving rod mounted at the other end portion of the handle, a rotatable shaft positioned in the straight portion of the handle and connected at one end to said counter driving rod, a flexible cable positioned in the bent end portion of said handle and extending into the straight body portion thereof, said cable having one end secured to said member and a coupling connecting the other end of the cable to the other end of the shaft, said coupling having a bearing surface in rotatable contact with the inner surface of said tubular handle to form a bearing for said cable.

7. A ground measuring instrument comprising a wheel of determined circumference, an open ended tubular handle, said handle having one end portion bent through an arc of ninety degrees to form a wheel supporting portion, said wheel being rotatably mounted on said portion adjacent the free end thereof, a lock ring washer fixed on the outermost end of said portion, a cap fixed on said wheel, a split cone nut fixed centrally in said cap to rotate therewith and extending over the adjacent open end of the tubular handle, a flexible cable positioned within the tubular handle and having one end secured to said nut, a counter having a driving rod mounted at the other end of said handle, a shaft connected to said driving rod and a coupling connecting the other end of said flexible cable to said shaft for driving the counter on rotation of the wheel.

CARL I. CEDERHOLM.

REFERENCES CITED

The following references are of record in the file of this patent:

UNITED STATES PATENTS

| Number | Name | Date |
|---|---|---|
| 1,835,804 | Morra | Dec. 8, 1931 |
| 2,325,910 | Hetzel | Aug. 3, 1943 |
| 2,495,340 | Milster | Jan. 24, 1950 |